July 12, 1966 P. M. SCHLUTER 3,260,208

SOLID PROPELLANT CHARGE FOR ROCKET MOTORS

Filed Feb. 26, 1962 3 Sheets-Sheet 1

INVENTOR.
PETER M. SCHLUTER

BY Gordon K. Lester

July 12, 1966 P. M. SCHLUTER 3,260,208
SOLID PROPELLANT CHARGE FOR ROCKET MOTORS
Filed Feb. 26, 1962 3 Sheets-Sheet 2

INVENTOR.
PETER M. SCHLUTER
BY Gordon K. Lister

July 12, 1966   P. M. SCHLUTER   3,260,208
SOLID PROPELLANT CHARGE FOR ROCKET MOTORS
Filed Feb. 26, 1962   3 Sheets-Sheet 3

INVENTOR.
PETER M. SCHLUTER
BY
Gordon K. Lister

United States Patent Office 3,260,208
Patented July 12, 1966

3,260,208
SOLID PROPELLANT CHARGE FOR ROCKET MOTORS
Peter Mueller Schluter, Princeton, N.J., assignor to Thiokol Chemical Corporation, Bristol, Pa., a corporation of Delaware
Filed Feb. 26, 1962, Ser. No. 175,844
6 Claims. (Cl. 102—98)

This invention relates to rocket engines performing with sliverless burnout of a composite propellant charge within said rocket engines, to composite propellant charges, and to methods of making said engines and composite propellant charges.

To get maximum thrust in rocket engines using solid propellants, an internal-burning configuration is often chosen for the propellant charge. Such a charge has a central, axial cavity, and burns outwardly from the surfaces of the cavity to the engine casing surrounding the charge, which casing is generally of circular cylindrical shape. The surface area of the charge available for burning is often increased by forming the cavity into complex patterns, such as the well-known "internal burning star" configuration.

These complex configurations result in a non-uniform radial distribution of the propellant charge defining the shape of the internal cavity. For example, considering a transverse section through a circular cylindrical rocket having a propellant charge with an internal star configuration, and defining a "star point" as an element in the burning surface of the propellant charge lying nearest the central axis of the rocket, then a smaller propellant mass lies along a radius drawn from the center of the star cavity to the circular engine casing when this radius is drawn through a star point. Because the propellant is generally chosen to burn uniformly, some portions of the propellant charge—particularly where propellant mass was initially concentrated—often remain when other portions of the propellant have elsewhere burned through to the engine casing. These unburned portions, or "slivers," form most often at those portions of a "star" cavity which lie on radial lines drawn through the star points.

To utilize the propellant most efficiently, and to promote constant pressure conditions within the rocket, it is desirable that there be sliverless burnout of the propellant charge. "Sliverless burnout" refers to a combustion process which, progressing from the ignition surface, reaches all points on the outer periphery of the propellant charge, as viewed in transverse cross section, substantially simultaneously. A sliverless burnout of propellant promotes a more efficient use of the propellant charge than does a combustion process which results in the formation of slivers. After consumption of a major portion of the propellant charge, and during the burning of residual slivers, the quantity of combustion products generated per unit of time within the rocket engine is decreased. A decrease in the operating pressure and thrust may ensue, and a stage may be reached in the course of sliver burning in which the rate of generating combustion products may fall below the rate required to maintain the thrust of the engine above its minimum useful value. Any propellant remaining after this stage has been reached is therefore wasted as a source of propulsive power and must be regarded as a part of the inert weight of the missile.

A redistribution of a mass of propellant equal to that found in residual slivers, into a charge of uniform burning characteristics increases the area of burning surface and permits maintenance of higher thrust values for a longer period of time, as well as effecting a sharp termination to the generation of thrust-producing gases. Thus, sliverless burnout makes maximum efficient use of the propellant, promotes conditions of constant pressure during the entire burning process, and permits greater control of the thrust generated by the propellant as a function of the burning time.

These desirable objectives are attained in the present invention by using a rocket engine having a propellant charge comprising a plurality of sections of solid propellant compositions having different burning rates, which sections are combined in an integral, solid-propellant charge. The invention includes the use in a propellant charge of more than two propellant compositions of a different burning rate, but it is advantageously described and practiced with a composite bipropellant charge.

A better understanding of the invention and of its many advantages can be had by reference to the accompanying drawings, in which FIGURE 1 is a perspective view, partly in section, of a rocket engine of a type advantageously including a composite propellant charge capable of sliverless burnout;

Figure 2:
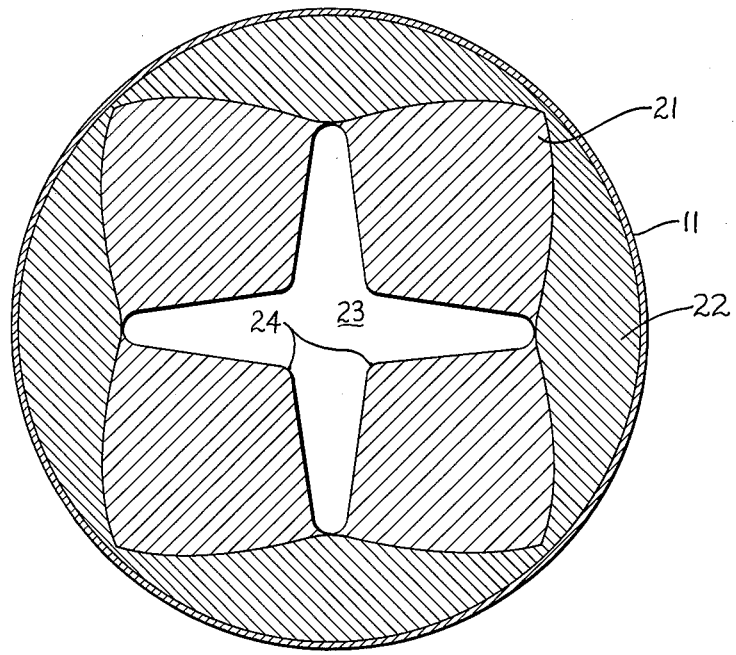
FIGURE 2 is a front elevation of the same rocket in transverse section showing the configuration of a composite propellant charge capable of sliverless burnout.
Figure 3:
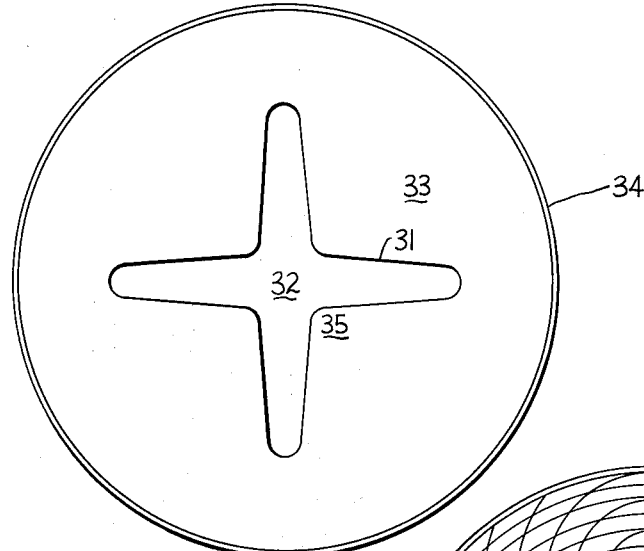
FIGURE 3 is the same transverse section shown in FIGURE 2, but showing only outlines of the external and internal cylindrical surfaces of the propellant charge for purposes of clarity.
Figure 4:
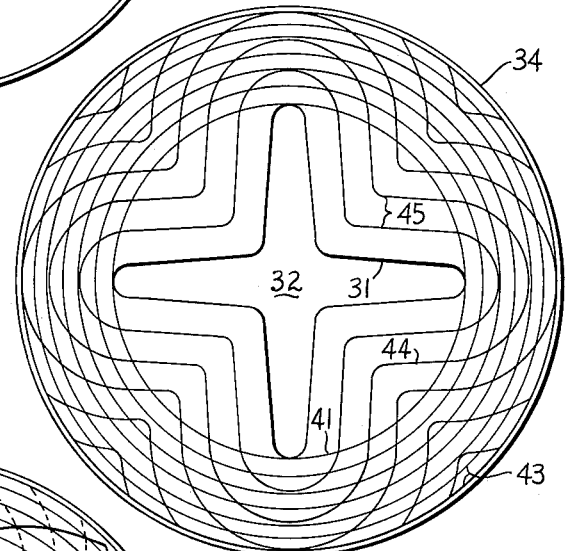
Figure 5:
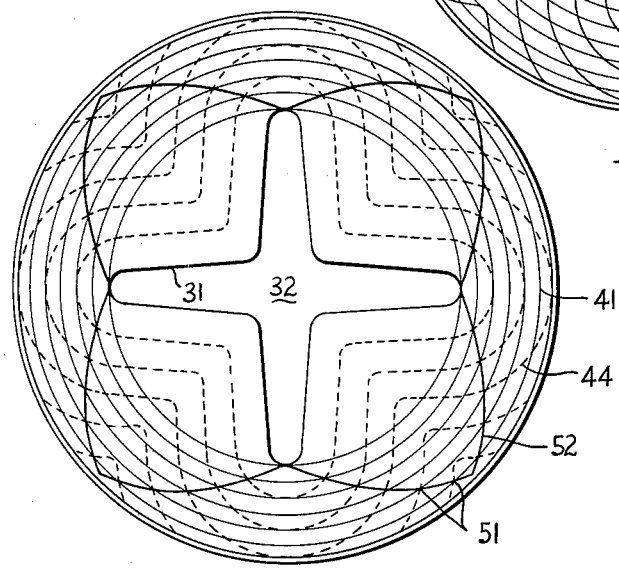

FIGURE 4 is the same transverse section shown in FIGURE 3, but on which have been superimposed the cross sections of two sets of coaxial cylinders: In the first set of said cylinders, the shortest perpendicular distance is everywhere equal from any point on one such cylinder to the external surface of said propellant charge. In the second set of said cylinders, the shortest perpendicular distance is everywhere equal from any point on one such cylinder to the internal surface of said propellant charge;

FIGURE 5 is the same transverse section shown in FIGURES 3 and 4, but in which the intersections of corresponding members of the two sets of cross sections shown in FIGURE 4 have been marked to outline the relative shapes of areas to be occupied by propellant compositions of different burning rates in a sliverless-burning, composite charge having the internal configuration pictured;

FIGURES 6a, b, and c are front elevations, all in transverse section, corresponding with FIGURE 2, and showing the propellant charge of FIGURE 2 at progressively different stages during the burning of said charge; and FIGURES 7a–7f are front views, in transverse section, of various sliverless burning composite bipropellants having different internal configurations.

Figure 1:
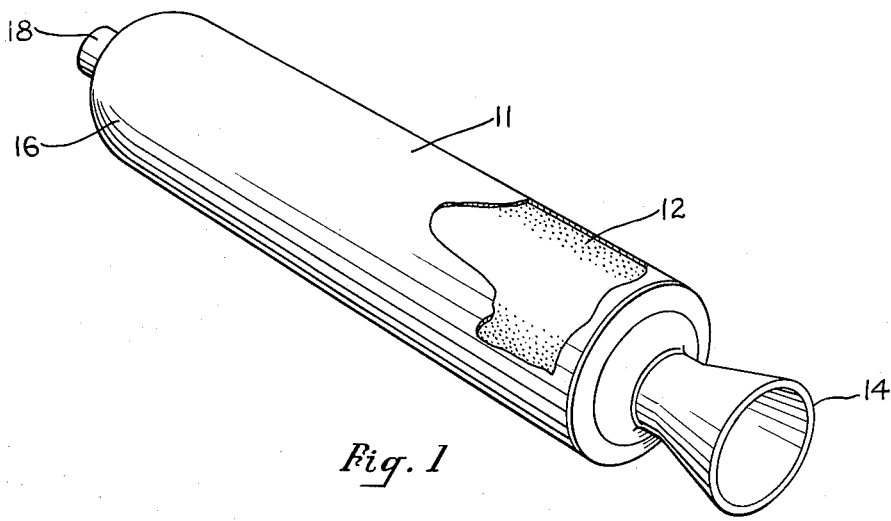

FIGURE 1 shows a rocket engine in which a composite propellant charge is conveniently included. The engine comprises hollow cylindrical engine casing 11 of circular cross-section and containing solid propellant charge 12 bonded to the walls of said casing 11. Casing 11 is closed at its forward end 16, where igniter 18 is mounted. Igniter 18 may be of a conventional type known to the art, and may be either chemical or electrical or both. Aft portions of engine casing 11 are equipped with nozzle means 14, through which exhaust gases from the burning of charge 12, when the latter is ignited, escape to provide motive power for the rocket.

FIGURE 2 is a transverse section through propellant charge 12 of FIGURE 1, and shows the charge bonded to the walls of engine casing 11. The charge comprises bonded portions of a first, faster-burning, propellant composition 21, surrounding central cavity 23 having a "star" configuration with "star points" 24. Propellant compositions 21 and 22 commonly comprise a cured combustible organic polymer, such as those of the polyester, polyurethane or polyether types, with which a finely-divided, solid, inorganic oxidizing agent such as the nitrates, chlorates, or perchlorates of the alkali or alkaline earth metals is admixed before curing. A differential in the burning rates of compositions 21 and 22 is achieved, for example, by use of polymer compositions which burn with different speeds; or, more conveniently, by using the same polymer composition for both propellant compositions 21 and 22, by varying the particle size of the oxidizing agent mixed with said polymer to make composition 21 relative to that mixed with said polymer to make composition 22. The composition containing the more finely divided oxidizer will burn more rapidly than the composition containing the less finely divided oxidizer, because the more finely divided oxidizer has the greater surface area available for chemical combination.

On consideration of the propellant charge configuration shown in FIGURE 2, it will be apparent that, if the charge were to comprise a uniformly-burning, single-propellant composition, those portions of the propellant lying on a radial line drawn equidistantly between two adjacent "star points" 24 of cavity 23 and engine casing 11 would burn through to casing 11 before other portions of the propellant. In this way, slivers of propellant would be left unburned on radial lines drawn through star points 24 after other portions of the propellant had already burned through to casing 11.

By fashioning charge 12 of FIGURE 1 of two or more propellant compositions of different burning rates, such as compositions 21 and 22 of FIGURE 2, all portions of the burning surface can be made to reach the walls of the engine casing simultaneously.

The shaping of the propellant charge is explained by reference to FIGURES 3, 4 and 5 of the drawings.

FIGURE 3 shows the external and internal outlines of a common configuration for an internal burning propellant charge, chosen similar to the charge shown in FIGURE 2 for purposes of illustration. Ignition surface 31 defines the shape of internal cavity 32 in propellant charge 33. Surface 34 is the outer periphery of the propellant charge. Cavity 32 has "star points" 35, and it is apparent that, if charge 33 is comprised of only a single, uniformly-burning propellant composition, those portions of the charge along a radius between two star points 35 will reach periphery 34 before portions of the propellant which lie along radii drawn through star points 35 are fully consumed. Thus, propellant "slivers" will be formed.

In FIGURE 4 is shown the same configuration as in FIGURE 3 in which cross-sectional lines of two sets of cylinders are shown superimposed on the outlines of FIGURE 3. These cross-sectional lines are an aid in determining the most advantageous relative shapes of slower-burning and faster-burning propellant in a composite propellant charge having the internal burning star configuration shown. The origin and use of the cross-sectional lines is described below.

It is evident that if all portions of a propellant charge are to burn simultaneously to the engine wall of a rocket, represented in FIGURES 3 and 4 by peripheral outline 34, the shape of the burning surface of the propellant charge at the instant before burning to the engine wall will be a uniform, cylindrical surface similar and coaxial with the cylindrical engine casing. The unburned propellant will have the form of a hollow cylinder, bounded by the burning surface on the one hand and the wall of the engine casing on the other.

Assuming the propellant charge to comprise only a single, uniformly burning composition, the outward course of burning of this composition can be imaginatively traced inwardly toward the center of the propellant as follows. Assuming the propellant composition to burn to the engine casing at an arbitrary time $n$, the burning surface at the time $n-1$ will be represented by a cylindrical surface which is everywhere equidistant from the engine-casing cylinder. This would be a right-circular cylinder, if the engine casing is a right-circular cylinder. Similar coaxial cylindrical surfaces will represent the burning surface at time $n-2$, $n-3$ $n-4$ . . . 3, 2, 1. At time 0, the burning surface is assumed to be the smallest cylinder which can be circumscribed about the central cavity. Each of these cylinders will be equidistant one from another, separated by a uniform arbitrary distance interval representing the amount of propellant composition burned in unit time.

Since the burning process in a rocket engine of the nature described preceds uniformly outward to the engine casing in a body of a uniformly burning propellant, it is evident that the above-described process could not occur if the shape of the internal cavity at which burning is initiated were itself of a cross-section dissimilar with the cross section of the engine casing. This would be true, however, if the shape of the burning surface at ignition—at time 0—were a cylindrical surface whose tangent is perpendicular to the largest diameter of the internal cavity.

In FIGURE 4, lines 41 represent the cross-sections of such a series of cylinders spaced uniformly from the periphery inwardly, the contour of each cylinder being equidistant from the outer periphery 34 of a propellant charge. Since the engine casing shown is a right circular cylinder, the lines 41 are all circles.

The innermost of lines 41 circumscribes the largest diameter of ignition surface 31 of internal cavity 32. The remaining lines 41, which are arbitrary in number, represent cylindrical surfaces proceeding concentrically outward to periphery 34, dividing the propellant charge into a number of cylindrical regions. Thus, much of FIGURE 4 represents the hypothetical course of burning of a uniformly burning single propellant composition from a uniform ignition surface at time 0 (this surface is represented by the innermost of lines 41) outward to periphery 34 at time $n$, where and when the charge will burn out without slivers. Intermediate lines 41 represent burning surfaces in this hypothetical case at times 1, 2, 3 . . . $n-3$, $n-2$, and $n-1$. Each surface is separated by interval 43.

A second burning process must now be envisioned, in which the buring process is traced outwardly from ignition surface 31 of cavity 32 through a propellant charge comprising a single uniformly burning propellant. In this case, the burning surface at a time 0 has cross-section 31. At times 1, 2, 3 . . ., the burning surfaces will be represented by equidistantly spaced, coaxial cylinders the contour of any one of which is everywhere equidistant from cross section 31, shown by lines 44 of FIGURE 4. It is evident that certain portions of these cylindrical burning surfaces reach periphery 34 before other portions—indicating the prior-art condition of burn-out with slivers. These surfaces are separated by interval 45.

If, now, intervals 43 and 45 are chosen to be directly proportional to the different rates of burning of two different propellant compositions, the composite diagram shown in FIGURE 4 will represent the course of burning of the propellant compositions, lines 44 representing the course of outward burning of a propellant composition initially ignited at surface 31, and lines 41 representing an inward retracing of the course of burning of a propellant composition burning to the wall without slivers.

In FIGURES 4 (and 5), a faster burning propellant composition has been indicated as the first-ignited, and a slower burning composition as the material burning out at periphery 34. This choice is evident from the size of interval 45, which is larger relative to interval 43. The distance intervals 45 and 43, it will be remembered, are a measure of the amount of propellant burned during an arbitrary unit time interval.

In FIGURE 5, points of intersection 51 between corresponding members of sets of lines 42 and 44 have been indicated. The intersections have been joined by line 52, which defines that boundary between the two propellant compositions of different burning rates which will give sliverless burnout at periphery 34, with ignition at surface 31.

"Corresponding members" of sets of lines 41 and 44 are those members of each set which represent the cross-section of the burning surface of the faster burning and slower burning propellant composition at the same instant of time. Thus the "0th order" (or innermost) members of each set show the burning surface cross-section at time 0. (It should be noted that this intersection is actually the point of tangency of the innermost line 41 with the central cavity.) The "1st order" members show the burning surface cross-sections at time 1, etc. It is evident that the intersections of corresponding members define the configuration of a bipropellant charge with the desired property of burning out at the engine casing without slivers despite ignition at a surface dissimilar to the surface of engine casing.

For clarity, FIGURES 3–5 show these relationships in terms of cross-sections. However, it must be remembered that a propellant charge is three-dimensional, and that lines 31, 34, 41, 44 and 52 are cross-sections of surfaces, real or imaginary, and that points 51 lie in lines in an interfacial surface between solid bodies of propellant compositions having different burning rates.

Figure 6:
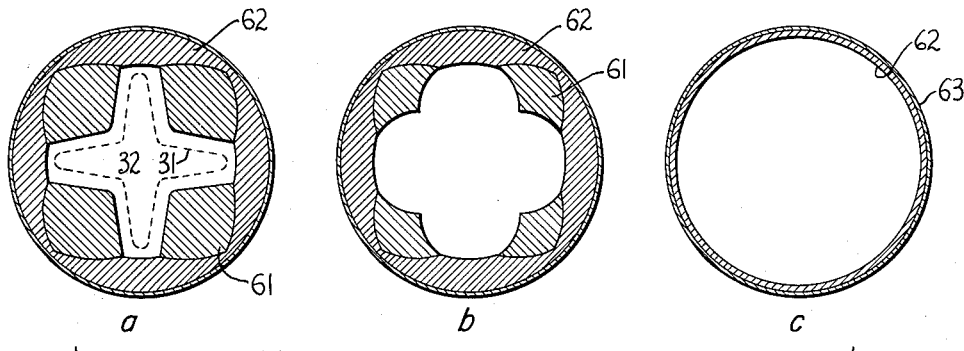

FIGURE 6 shows three cross-sectional views of the propellant charge of FIGURES 2, 3, 4, and 5 during burning. In FIGURE 6a the propellant charge is shown shortly after ignition, with an outline 31 of the original ignition surface added in broken lines. It is apparent that lobar portions 61, comprising faster burning propellant compositions, are preferentially consumed, as compared with the slower burning propellant in 62 between the "star points" of cavity 32. As shown in FIGURE 6b, the reaction progresses with gradual destruction of the original star configuration, because of the differential burning rates of compositions of 61 and 62. Finally, as shown in FIGURE 6c, lobar portions 61 of FIGURES 6a and 6b disappear entirely, leaving only slower burning propellant composition in 62 in a configuration the burning surface of which is everywhere equidistant from the peripheral casing 63 in which it is located. The propellant charge shown will burn out without leaving slivers.

FIGURES 7a–7f show a number of composite bipropellant charges based on internal burning configurations commonly used. Each figure shows the central cavity 32 at which the charge is first ignited, portions 71 of a faster burning propellant composition, and portions 72 of a second slower burning propellant composition. Each of the composite configurations burns without slivers remaining at burnout.

Figure 7A:
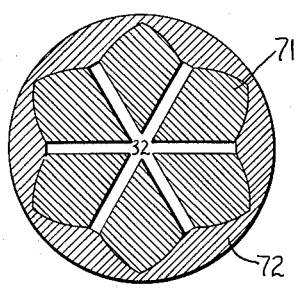
Figure 7B:
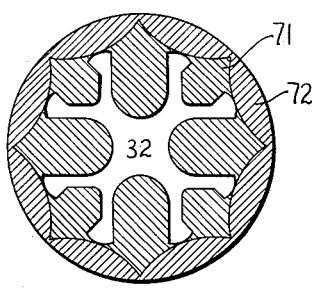
Figure 7C:
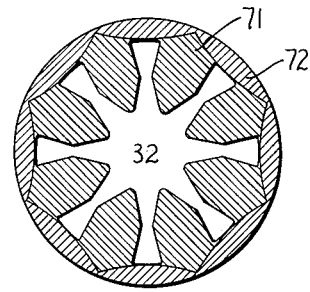
Figure 7D:
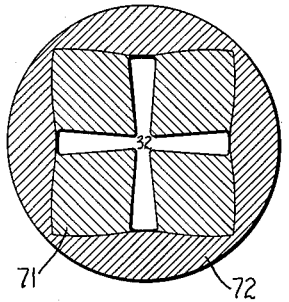
Figure 7E:
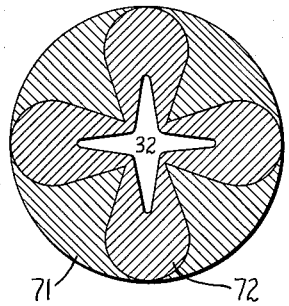
Figure 7F:
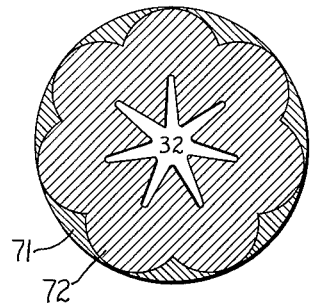

Although the embodiment shown in FIGURES 2 and 6, which embodiment is derived in FIGURES 3–5, has a faster burning propellant composition in portions of the charge closest to the ignition surface, and a slower burning propellant in peripheral portions of the charge, such a choice is not critical to the invention. For example, FIGURES 7e and 7f show embodiments in which a slower burning propellant composition is first ignited, and portions of a faster burning composition lie in positions more remote from the ignition surface. Configurations such as these are obtained, as above described, by choice of the intervals 43 and 45 of FIGURE 4 to be proportional to the rates of burning of the two propellant compositions.

As mentioned earlier, the nature of the propellant compositions is not critical to the invention. A wide variety of suitable synthetic resins are known to the art, which resins can be compounded with solid oxidizers therein to give a propellant mixture. For example, polyethylene, polysulfide rubbers, polyethers, polyesters and polyurethanes can be mixed with from 35% to 85% by weight of a solid oxidizer such as the nitrates and perchlorates of the alkali and alkaline earth metals. The burning rate of the compositions can be conveniently increased or decreased respectively by decreasing or increasing the particle size, respectively, of oxidizer in the compositions.

The resins and oxidizers are mixed first. A curing agent is added and the mixture is cast into a rocket engine casing and cured in situ. By using mandrels, a wide variety of internal configuration can be achieved. In casting a bipropellant charge such as is shown in FIGURE 2 for example, a slower burning composition can first be cast adjacent to the case wall using a large mandrel. After curing, the first mandrel is replaced with another defining the ignition surface of the central cavity. A faster burning propellant is then cast into the interstices between the first cast structure and the mandrel.

Examples 1 and 2 below are of typical faster burning and slower burning propellant pairs suitable for use in forming the composite charges of the present invention.

*Example I*

To prepare a bipropellant charge composed of two different propellant formulations, the relative burning rates are first determined. For example, a faster-burning propellant, composed, by weight of

| | Percent |
|---|---|
| Polybutadiene acrylic acid | 10.62 |
| Epoxide curing agent ($C_{19}H_{23}O_4$) | 2.25 |
| Ammonium perchlorate | 69.31 |
| Aluminum powder | 15.84 |
| Ferric oxide | .99 |
| Dioctyl sebacate | .99 | has a burning rate of 0.413 inch per second at 600 p.s.i.a. chamber pressure. A slower burning propellant, composed, by weight, of

| | Percent |
|---|---|
| Polybutadiene acrylic acid + epoxide curing agent ($C_{19}H_{23}O_4$) | 16.00 |
| Aluminum powder | 16.00 |
| Ammonium perchlorate | 68.00 | has a burning rate of 0.207 inch per second at 600 p.s.i.a. chamber pressure. Thus, the faster-burning propellant burns approximately twice as fast as the slower-burning propellant. A drawing was made according to the method described above (and illustrated in FIGURES 3, 4, and 5) in which the outer periphery of the grain and the central cavity configuration were both given, and in which the spaces 45 were twice as large as spaces 43. A mandrel was then made having a cross section congruent with the surfaces 52 defined in the drawing. This mandrel was then positioned in a rocket engine case along the central axis thereof and the slower-burning propellant was cast around it and cured by exposure to 135° F. for 96 hours, after which the mandrel was withdrawn and replaced with a second mandrel having a cross sectional configuration congruent with the desired configuration for the central cavity. The faster-burning propellant was poured between the second mandrel and the slower-burning propellant and cured by exposure to 135° F. for 96 hours. The mandrel then was withdrawn, leaving a case-bonded bipropellant charge.

*Example II*

A bipropellant charge shaped as disclosed in Example I was prepared using two propellant compositions of different burning rate prepared by varying the particle size of the oxidizer therein.

A first batch of the slower burning composition of Example I was prepared in which the 68% of ammonium perchlorate oxidizer present comprised 10 parts by weight having a particle size of 18 microns and 90 parts having a particle size of 180 microns.

A second batch was prepared in which the oxidizer was a 50–50 mixture, by weight, of ammonium perchlorate of 18-micron and 180-micron particle sizes. The second batch has a burning rate 1.4 times that of the first batch.

Appropriately shaped mandrels, whose shape is determined as in Example I, were used to cast bipropellant charges from the two propellant mixtures disclosed herein.

Although specific embodiments have been shown and described, it is to be understood that they are illustrative, and are not to be construed as limiting on the scope and spirit of the invention.

What is claimed is:

1. In a solid propellant rocket engine having an elongated casing and a discharge nozzle at one end thereof, a solid, circumferentially continuous, composite propellant grain bonded to said casing and having a central cavity extending longitudinally therethrough, said composite grain comprising at least two different propellants arranged symmetrically about the longitudinal axis of said engine, each of said propellants being essentially composed of a dispersion of inorganic oxidizer in a cured combustible organic polymer, said propellants having different burning rates, said propellants being contiguous and having interfaces of substantially uniform cross-section longitudinally of said grain, said cross-sections being the loci of intersections of a plurality of sets of closed curves concentric with said engine axis and corresponding in number to the number of said propellants, the curves of each set being located between said cavity and casing and being spaced from one another at intervals proportional to the burning rate of one of said propellants, whereby said propellant grain upon ignition burns outwardly to said casing without residual propellant slivers.

2. A solid, circumferentially continuous, composite propellant grain of generally cylindrical configuration and having a central cavity extending longitudinally therethrough, said composite grain comprising at least two different propellants arranged symmetrically about the longitudinal axis of said grain, each of said propellants being essentially composed of a dispersion of inorganic oxidizer in a cured combustible organic polymer, said propellants having different burning rates, said propellants being contiguous and having interfaces of substantially uniform cross-section longitudinally of said grain, said cross-sections being the loci of intersections of a plurality of sets of closed curves concentric with said grain axis and corresponding in number to the number of said propellants, the curves of each set being located between said cavity and the external surface of said grain and being spaced from one another at intervals proportional to the burning rate of one of said propellants, whereby said propellant grain upon ignition burns outwardly to extinction without residual propellant slivers.

3. A solid, circumferentially continuous, composite propellant grain of generally cylindrical configuration and having a central cavity extending longitudinally therethrough, said composite grain being composed of two different propellants arranged symmetrically about the longitudinal axis of said grain, each of said propellants being essentially composed of a dispersion of inorganic oxidizer in a cured combustible organic polymer, said propellants having different burning rates, said propellants being contiguous and having an interface of substantially uniform cross-section longitudinally of said grain, said cross-section being the locus of intersections of two sets of closed curves concentric with said grain axis and the curves of each set being located between said cavity and the external surface of said grain, the curves of one set being circles concentric with said grain axis and the curves of the other set being geometrically similar to the contour of said cavity, and the curves of each set being spaced from one another at intervals proportional to the burning rate of one of said two propellants, whereby said propellant grain upon ignition burns outwardly to extinction without residual propellant slivers.

4. A composite propellant grain according to claim 3 and wherein the faster burning of said two propellants is adjacent to said cavity.

5. A composite propellant grain according to claim 3 and wherein the faster burning of said two propellants is adjacent to the external surface of said grain.

6. A composite propellant grain according to claim 3 and wherein said two propellants contain oxidizer in different states of sub-division to produce said different burning rates.

References Cited by the Examiner

UNITED STATES PATENTS

| | | | |
|---|---|---|---|
| 117,388 | 7/1871 | Crary | 102—40 |
| 2,799,987 | 7/1957 | Chandler | 60—35.6 |
| 2,989,388 | 6/1961 | Toulmin. | |
| 3,002,459 | 10/1961 | Harper | 102—98 |
| 3,008,417 | 11/1961 | Keathley et al. | 102—98 |
| 3,009,385 | 11/1961 | Burnside | 86—1 |
| 3,010,355 | 11/1961 | Cutforth | 86—1 |

BENJAMIN A. BORCHELT, *Primary Examiner.*

SAMUEL FEINBERG, *Examiner.*

R. F. STAHL, *Assistant Examiner.*